J. A. ASHLEY-REAVIS.
WEIGHING MEANS OR SCALE FOR WAGONS.
APPLICATION FILED MAY 26, 1908.
1,022,811.
Patented Apr. 9, 1912.
2 SHEETS—SHEET 1.
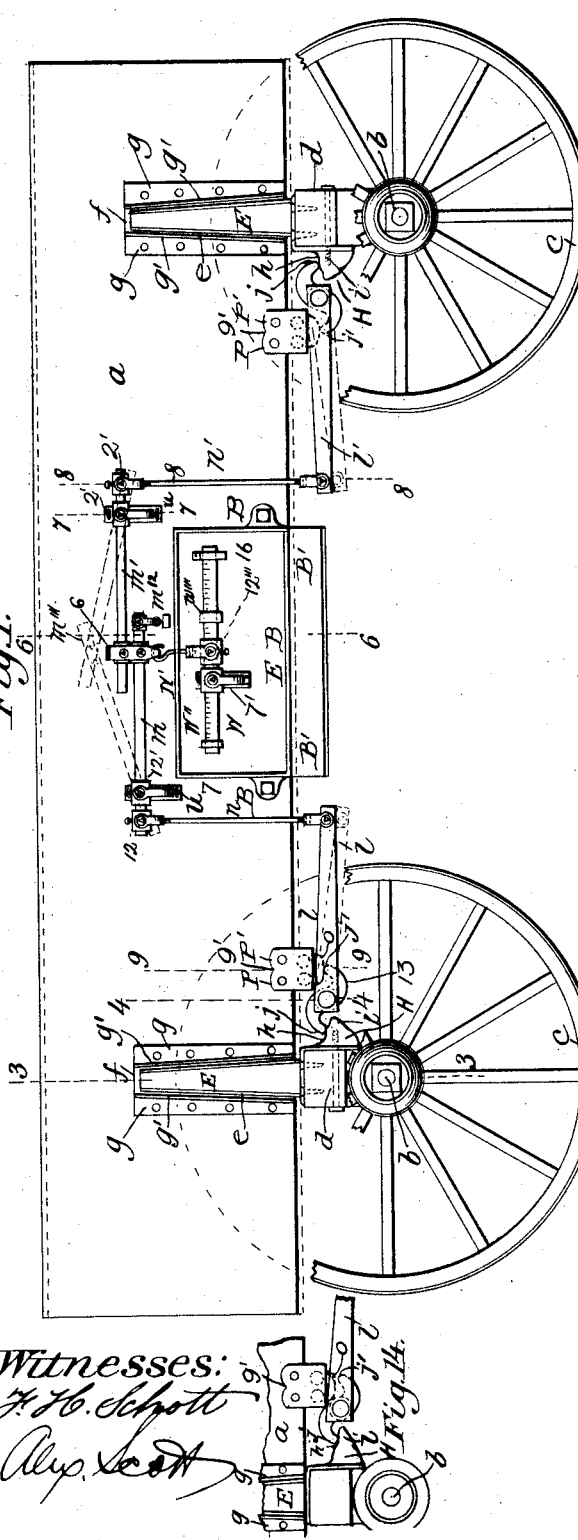
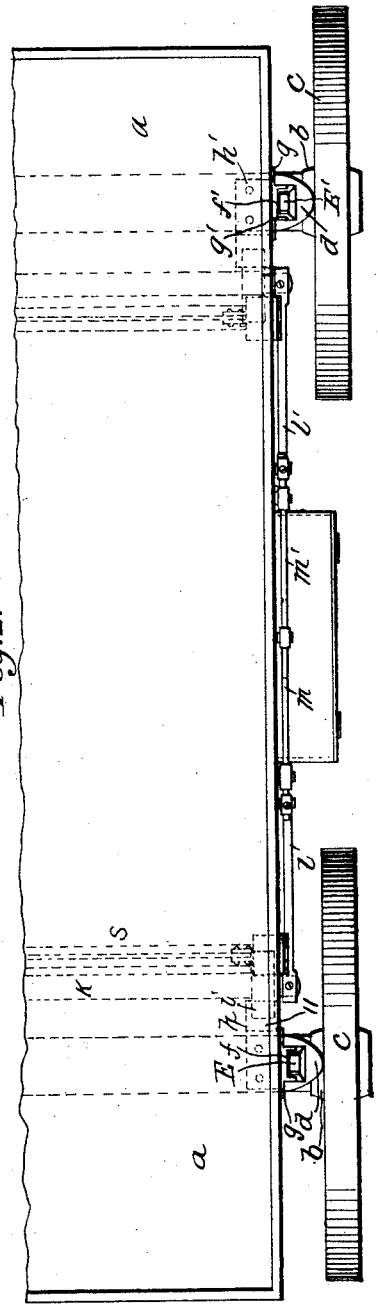

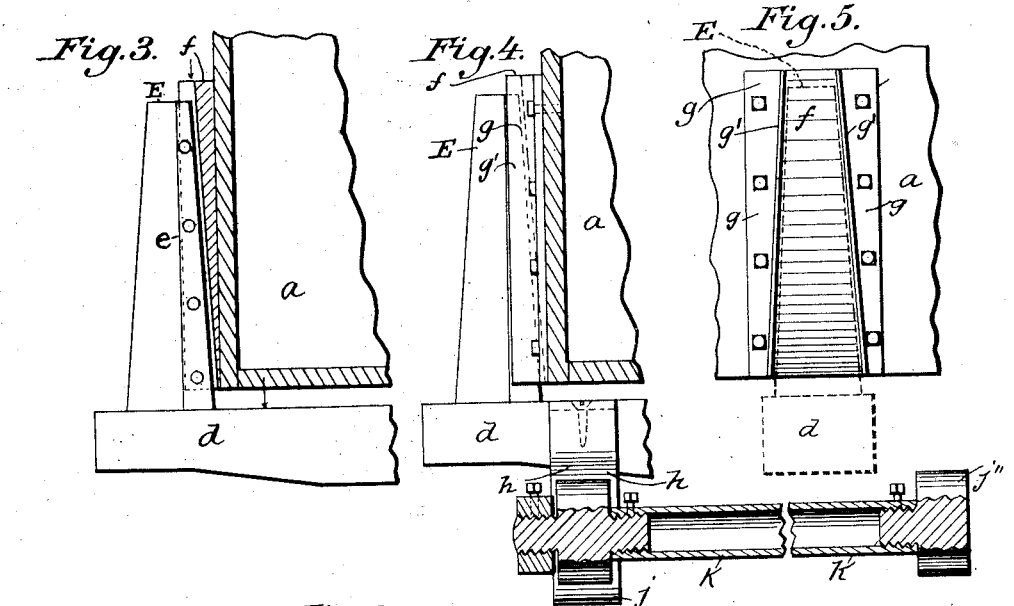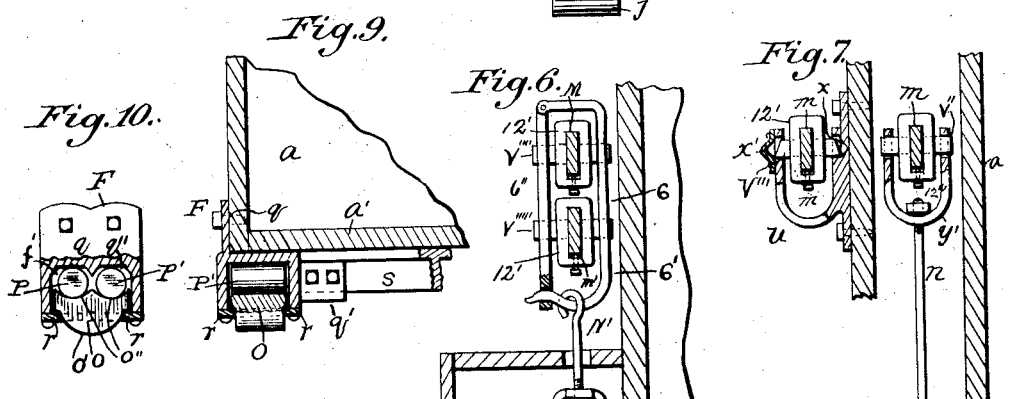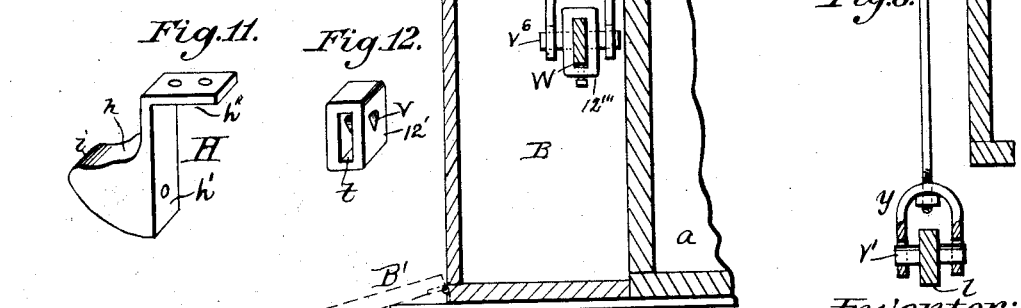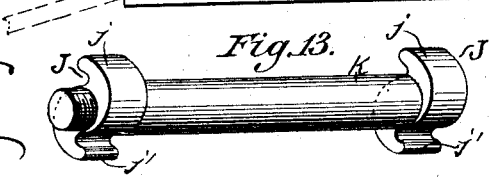

UNITED STATES PATENT OFFICE.

JAMES A. ASHLEY-REAVIS, OF DENVER, COLORADO.

WEIGHING MEANS OR SCALE FOR WAGONS.

1,022,811.  Specification of Letters Patent.  Patented Apr. 9, 1912.

Application filed May 26, 1908.  Serial No. 435,129.

*To all whom it may concern:*

Be it known that I, JAMES ADDISON ASHLEY-REAVIS, a citizen of the United States, residing in the city and county of Denver, in the State of Colorado, have invented a new and useful Weighing Means or Scale for Wagons, of which the following is a specification.

My invention relates to improvements in weighing machines or scales, which constitute a means of weighing by a system of levers fulcrumed upon a wagon whose bed or body is detachable from the running gear in order that such bed or body may be employed as a platform for the scales to be lifted by the action of said levers with the load it is desired to weigh and the weight indicated upon a central beam, fulcrumed upon such bed or body.

The leading features of my invention are involved in a combination of levers and supports which have curved pivotal surfaces and which are attachable to the wagon and detachable therefrom at pleasure, this result being obtained by the use of a few bolts, and without any addition to, or change in, an ordinary farm wagon to which the scales are attached.

I will now proceed to describe the invention in connection with the accompanying drawings, realizing that there are various possibilities of variation therefrom, and it is understood that the invention is limited only by the appended claim.

In the drawings forming part hereof—
Figure 1, is a side elevation of a common farm wagon with my weighing means attached thereto. Fig. 2, is a top plan in part illustrating my weighing means as it appears upon the left-hand side only of the wagon. Figs. 3 and 4, represent side elevations only of one of my bolster standards and the casing therefor, this casing being shown in section in Fig. 3, and the twist shaft similarly so shown in Fig. 4, the wagon bed with the casing being shown in both views raised as when the scale is in action. Fig. 5, represents a face view of the standard casing, the bolster and standard being shown in dotted lines. Fig. 6, represents a cross-section of the scale beam as shown in Fig. 1, on the line 6—6. Fig. 7, represents a cross-section of the fulcrum-bracket upon the line 7—7. Fig. 8, represents a partial section upon the line 8—8. Fig. 9, represents a section of a detail shown in Fig. 1, upon the line 9—9, showing the rollers and push-block. Fig. 10, represents a different view in section of the device shown in Fig. 9, partly broken away. Fig. 11, represents a perspective view of my main fulcrum block detached, this support being adapted to be secured to the bolster. Fig. 12, represents my pivot sleeve in perspective. Fig. 13, represents my twist shaft in perspective showing a pair of fulcrum levers connected thereto. Fig. 14, represents my fulcrum block and lever when out of action.

My invention includes a system of levers for weighing purposes, the same being attachable to an ordinary farm wagon without substantial change in any part thereof, as shown in Figs. 1 and 2, wherein the wagon bed $a$, is used as a platform for my weighing scales.

The running gear of the wagon includes axles $b$, $b$, with wheels $c$, $c$, and the bolsters $d$, $d$, the latter serving as supports for standards E, E. Casings $g$, $g$, upon the bed engage the standards normally, as shown in Fig. 14, and are disengaged automatically when the bed is elevated and the scale is in action; since the outwardly projecting flanges $g'$, $g'$, and contact faces $f$, $f$, of the casings are sloped upwardly toward the standards, the latter being provided with opposing faces correspondingly inclined. The standards may be provided with a sheathing of iron as shown at $e$.

The running gear of the wagon is provided with fulcrum blocks H—H, secured to the sides of the bolsters $d$, $d$. These fulcrum blocks are each preferably provided with two surfaces $h'$, $h''$, at right angles to one another, and which rest respectively on the lateral and upper faces of the bolsters, to which the blocks may be secured by bolts or screws, as shown. Each fulcrum block is provided with a slightly convex bearing surface $h$, upon which when the scales are brought into action, rest the convex fulcrum bearing surface $j$, of one of the fulcrum levers J. The other convex surface $j'$, of each of these levers is brought, when the scales are in action, into contact with the curved bearing surface $o'$, of one of the push-blocks $o$, connected to the underside of the wagon body through housing F, in which the block is movably mounted, the housing for this purpose being provided with a chamber $f'$, into which the push-block loosely fits. Rollers P, P', are placed between the upper wall of this chamber and the upper surface of the push-block, this surface being provided with concavities $q''$, to receive the rollers. The blocks are retained in the housings by plates $r$, detachably secured to the lower face of the housings. It will be understood that two of these blocks are provided at each end of the wagon body and that the fulcrum levers that coöperate therewith are connected by means of the usual twist shaft K, to one end of which is connected also the first reduction lever $l$. The pairs of housings at either end of the body are connected by a T-rail S, (Fig. 9), secured to the underside of the body and to the housings at opposite sides of the body by means of lugs $q'$, on the housings, which are provided for this purpose. Each housing is also provided with a flange $q$, secured to the side of the wagon body. The reduction levers $l$, at the front and rear of the body are connected through yoke $y$ and knife edge $v'$, yoke $y$ and knife edge $v''$, links $n, n'$, respectively, with the second reduction levers $m, m'$, respectively, pivoted in fulcrum brackets $u$, adjustably secured to the side of the wagon body by means of bolts or screws inserted through horizontal slots at the upper and lower extremities of the brackets. Lever $m$ carries a counterweight $m^{12}$. The levers $m, m'$, are connected by means of a rectangular stirrup 6, which consists of a straight front piece $6''$, and a back piece $6'$, the latter having two forwardly projecting arms, one of which is hinged to the front piece at its upper end and the other detachably interlocked with said piece at the lower end, which is provided for this purpose with an aperture adapted to receive the crooked extremity of the said lower arm. These front and rear pieces are provided with openings to receive the pivots of the levers $m, m'$, these pivots being preferably carried by pivot sleeves $12'$, which are adjustably connected to the levers by being sleeved thereon, and are held in position by set screws as shown in Fig. 6, this construction being preferably employed for all of the pivots of each of the levers mounted on the side of the wagon body. The pivot sleeves $12'$ are connected to the stirrup and back piece by the knife edge parts $v''''$ and $v'''''$.

The weigh beam W, is connected to the above-mentioned stirrup 6, by means of the swivel rod N', connected to the yoke $z'$, the latter being provided at its lower extremity with openings for the pivots $v^6$ of the lever W, which is fulcrumed in bracket $7'$, adjustably mounted on the side of the wagon body in the same manner as are the brackets $u$. The bearings for the knife edges in these brackets are preferably constructed, as shown in Fig. 7, with seats for the knife edges $v'''$ formed by the openings, that in the outer arm being closed by means of a plate $x'$, having a conical recess in its inner face, the largest diameter of this recess being substantially that of the seat openings. A like concavity may be formed in the other arm of the bracket, as shown at $x$. The knife edges are preferably at their ends provided with surfaces inclined from the contact edges toward the sides of the levers, as shown in Fig. 7. By this construction grinding action of the ends of the knife edges against the adjacent edges of their seats is avoided. The beam W, is provided with the usual guard 16, which limits its swing, and with the usual weighing counterpoises $w''$ and $w'''$.

When the scale is to be thrown out of action the lower end of the front plate $6''$, is disengaged from the forwardly projecting end of the rear plate $6'$, of the yoke 6, which may then be removed from the levers $m, m'$. The latter are then free to rise and the wagon body will thus be lowered until it rests upon the bolsters, and, upon further upward movement of said lever, the surfaces $j'$, will become disengaged from the blocks $o$, and the levers $l, l'$, with their connected parts are then free to assume any position so long as contact surfaces $j$, of the fulcrum levers rest upon the fulcrum blocks H. In the actual weighing operation, however, I prefer to have these levers so adjusted that the surfaces $j$, are in contact with the convex surfaces $h$, of these blocks.

To prepare for weighing action, the levers $m, m'$, must be forced down, and the stirrup 6, replaced thereon. The lever W, may be incased in a suitable box or receptacle B, which may be secured to the side of the wagon body and may be provided with a door B', as shown.

Claim.

In combination, a wagon having a body and running-gear, roller bearing push blocks on said body, fulcrum levers adapted to engage said fulcrum supports and said push blocks, pivot blocks on said body, levers fulcrumed on said pivot blocks, connecting means between said fulcrum levers and said last named levers, a central beam, connecting means between said last named levers and said central beam, said connecting means including a stirrup having a hinged side.

In testimony whereof I hereunto set my hand in the presence of two subscribing witnesses.

JAMES A. ASHLEY-REAVIS.

Witnesses:
HAROLD JOHNSON,
EUGENE BUDER.

Copies of this patent may be obtained for five cents each, by addressing the "Commissioner of Patents, Washington, D. C."